(12) United States Patent
Chang

(10) Patent No.: US 6,695,258 B1
(45) Date of Patent: Feb. 24, 2004

(54) KITE DEVICE

(76) Inventor: Chin-Chuan Chang, 58, Ma Yuan West St., Taichung (TW)

( * ) Notice: Subject to any disclaimer, the term of this patent is extended or adjusted under 35 U.S.C. 154(b) by 83 days.

(21) Appl. No.: 10/286,922

(22) Filed: Oct. 25, 2002

(51) Int. Cl.[7] .............................................. B64C 31/06
(52) U.S. Cl. ................................ 244/153 R; 244/153 A
(58) Field of Search ...................... 244/153 R, 153 A, 244/154, 155 R; 446/34, 61, 62, 67; D21/445, 446

(56) References Cited

U.S. PATENT DOCUMENTS

| | | | |
|---|---|---|---|
| 2,632,614 A | * | 3/1953 | Bodell |
| 2,768,803 A | * | 10/1956 | Smith |
| 2,793,829 A | * | 5/1957 | Brumfield |
| 4,779,825 A | * | 10/1988 | Sams |
| 6,273,368 B1 | * | 8/2001 | Zheng |
| 6,283,413 B1 | * | 9/2001 | Bukur |
| 6,398,614 B1 | * | 6/2002 | Wu et al. |

FOREIGN PATENT DOCUMENTS

| | | | | |
|---|---|---|---|---|
| FR | 419652 | * | 8/1910 | ............. 244/153 R |
| GB | 2037170 | * | 7/1980 | ............. 244/153 A |

* cited by examiner

Primary Examiner—Tien Dinh

(57) ABSTRACT

A kite device has an inner main body, and an outer main body surrounding the inner main body. The inner main body has a main shaft, a plurality of fabric plates adhered on the main shaft, and each fabric plate having an edge to receive a support frame. The outer main body has a first flexible rod having a first end socket and a second end socket, a second flexible rod having a first end inserted in the first end socket and a second end inserted in the second end socket, and a waterproof fabric sheet having a plurality of triangular fabric pieces and a plurality of spacings formed among the triangular fabric pieces. A plurality of collars are disposed on an outer periphery of the waterproof fabric sheet. Each collar clamps the corresponding triangular fabric pieces and encloses one of the corresponding first flexible rod and the second flexible rod.

3 Claims, 9 Drawing Sheets

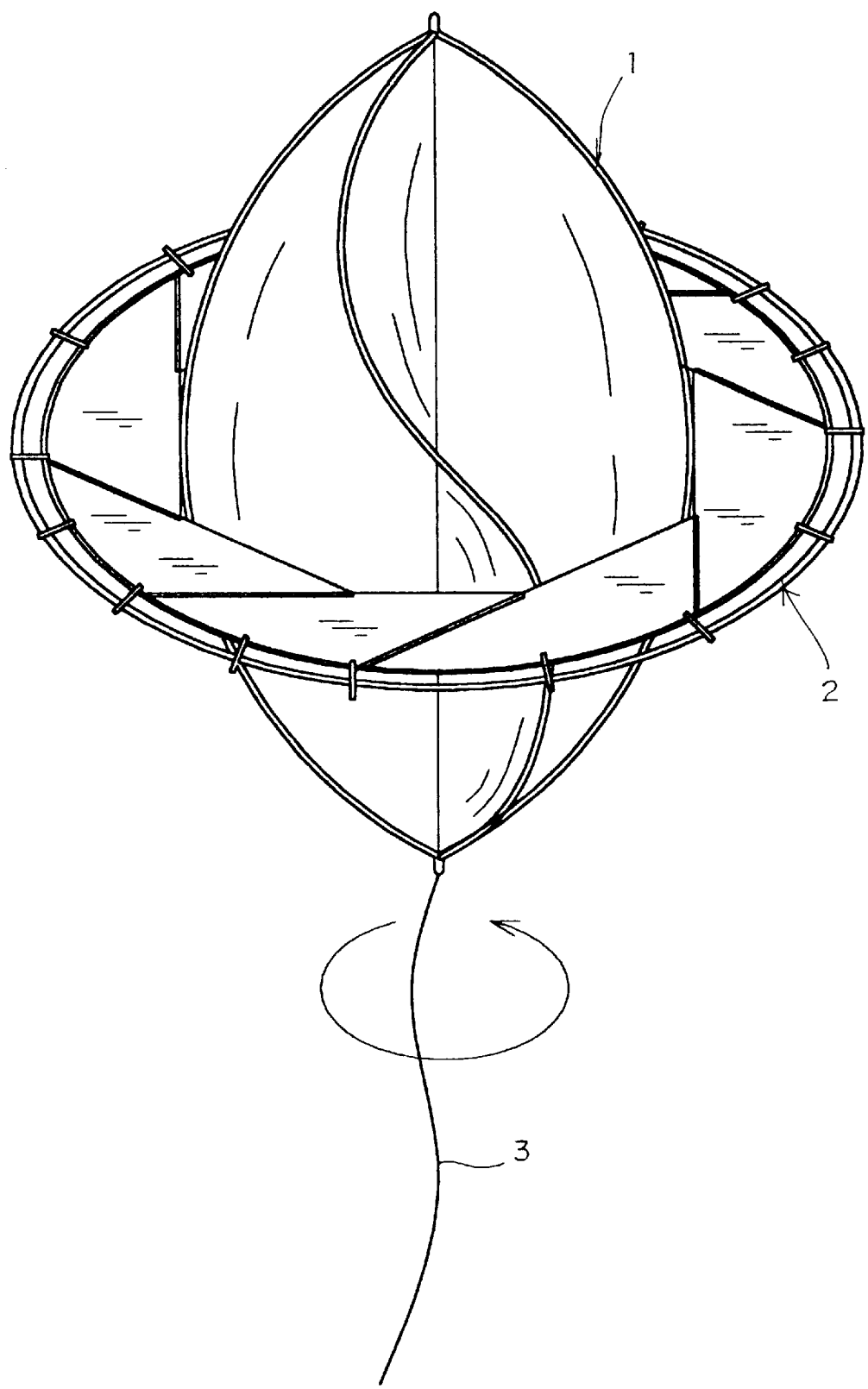
F I G. 8

KITE DEVICE

BACKGROUND OF THE INVENTION

The present invention relates to a kite. More particularly, the present invention relates to a kite device which has an outer main body surrounding an inner main body.

A conventional kite has a spine adhered on a cover sheet. A tail band is connected to the spine. However, the conventional kite cannot be detached.

SUMMARY OF THE INVENTION

An object of the present invention is to provide a kite device which is easily detached.

Another object of the present invention is to provide a kite device which has an outer main body surrounding an inner main body in order to increase areas for facing winds.

Another object of the present invention is to provide a kite device which has an outer main body having a plurality of spacings to facilitate air currents to pass through the spacings in order to balance the kite device.

Accordingly, a kite device comprises an inner main body, and an outer main body surrounding the inner main body. The inner main body has a main shaft, a plurality of fabric plates adhered on the main shaft, and each of the fabric plates having an edge to receive a support frame. The outer main body has a first flexible rod having a first end socket and a second end socket, a second flexible rod having a first end inserted in the first end socket and a second end inserted in the second end socket, and a waterproof fabric sheet having a plurality of triangular fabric pieces and a plurality of spacings formed among the triangular fabric pieces. A plurality of collars are disposed on an outer periphery of the waterproof fabric sheet. Each of the collars clamps the corresponding triangular fabric pieces and encloses one of the corresponding first flexible rod and the second flexible rod.

BRIEF DESCRIPTION OF THE DRAWINGS

FIG. 8 is a schematic view illustrating a flying line connected to a main shaft of a preferred embodiment in accordance with the present invention.

DETAILED DESCRIPTION OF THE INVENTION

Figure 1:
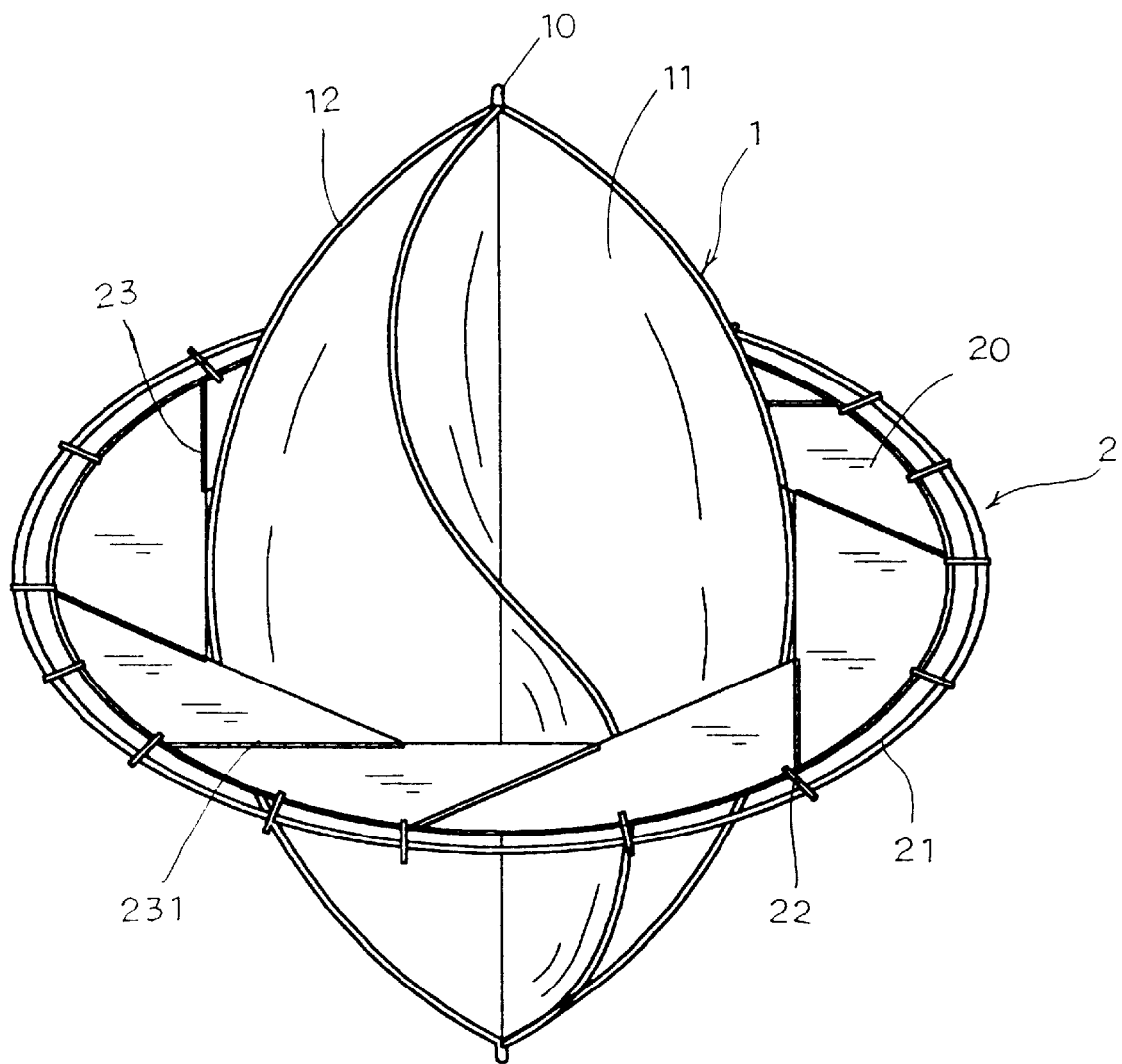
FIG. 1 is a perspective assembly view of a kite device of a preferred embodiment in accordance with the present invention.
Figure 2:
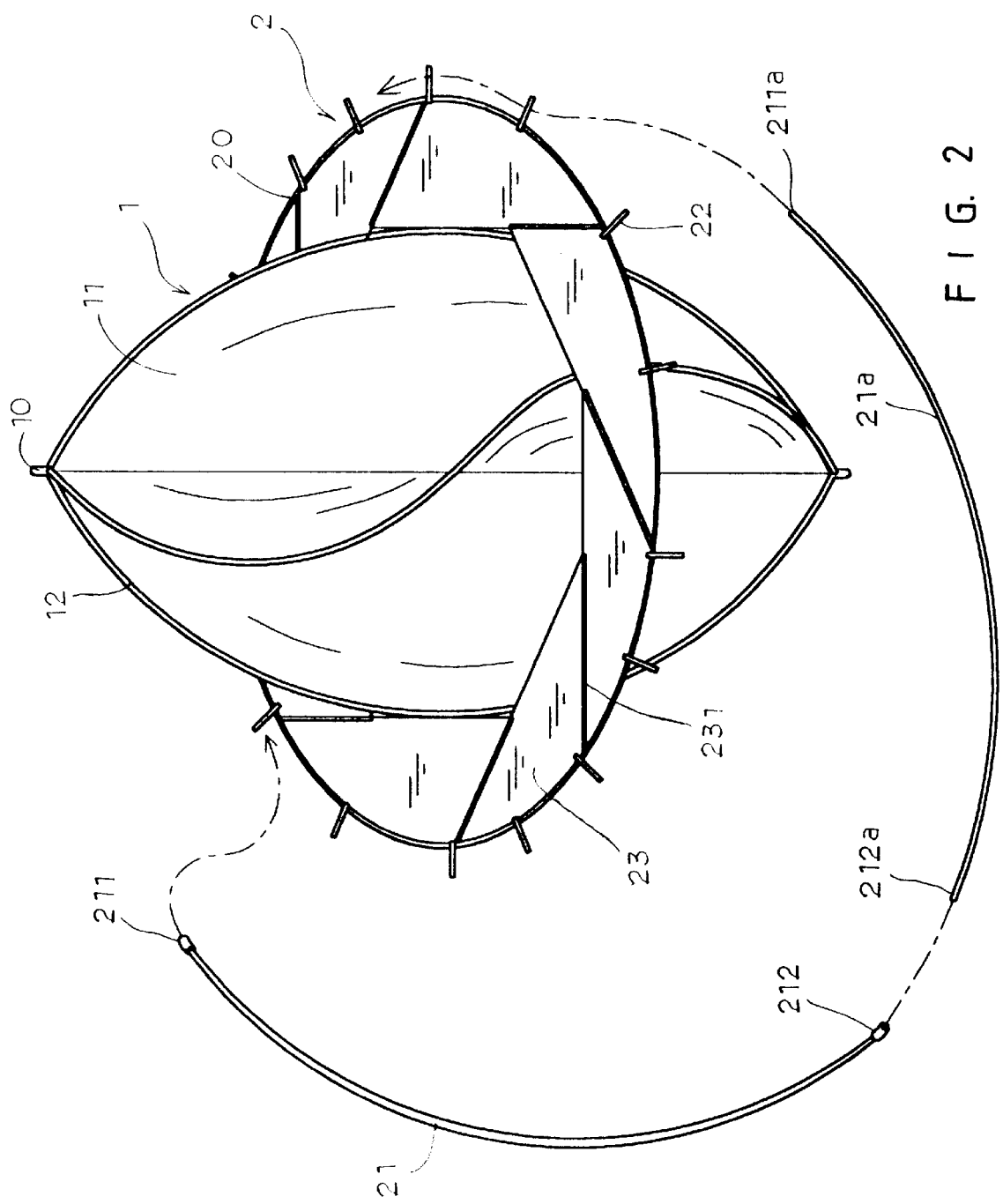
FIG. 2 is a perspective exploded view of a kite device of a preferred embodiment in accordance with the present invention.
Figure 3:
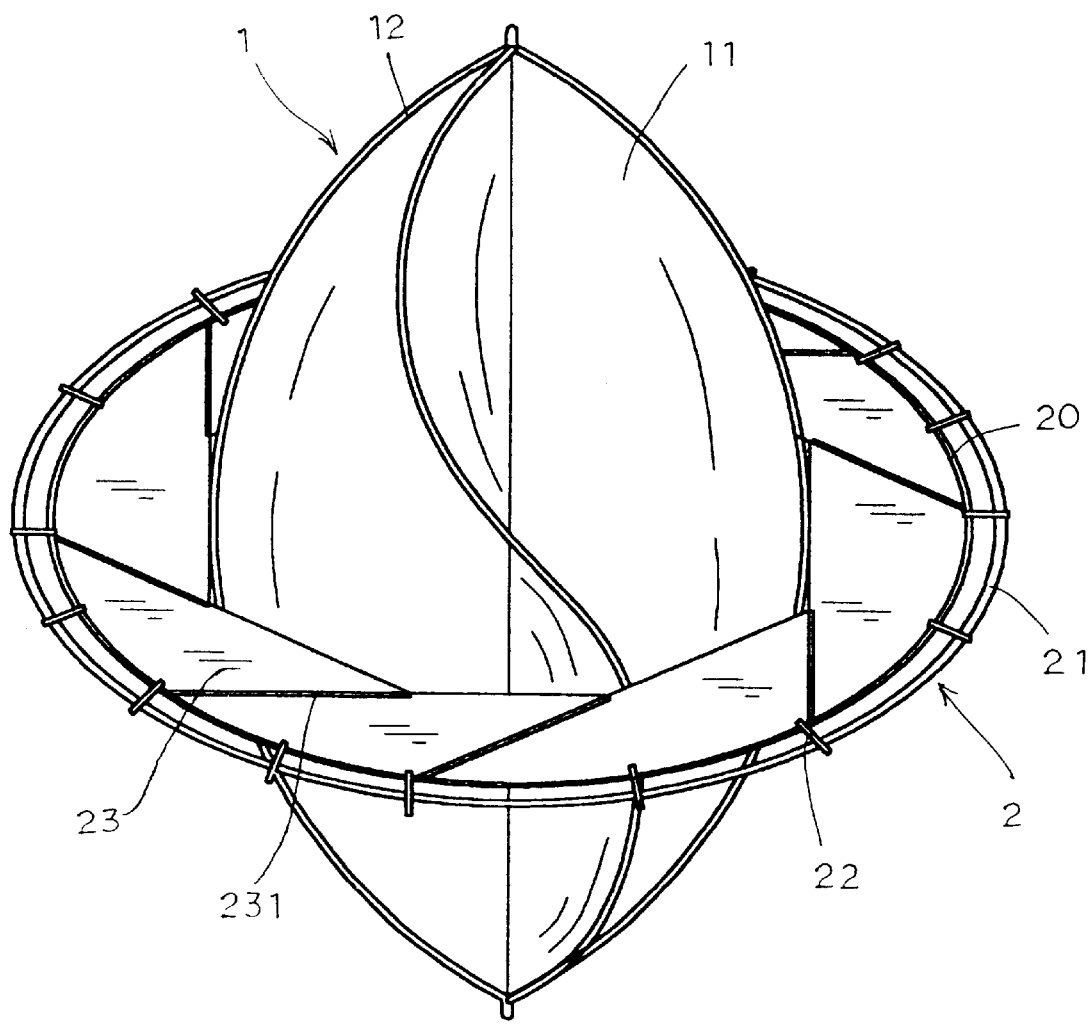
FIG. 3 is a second perspective assembly view of a kite device of a preferred embodiment in accordance with the present invention.
Figure 4:
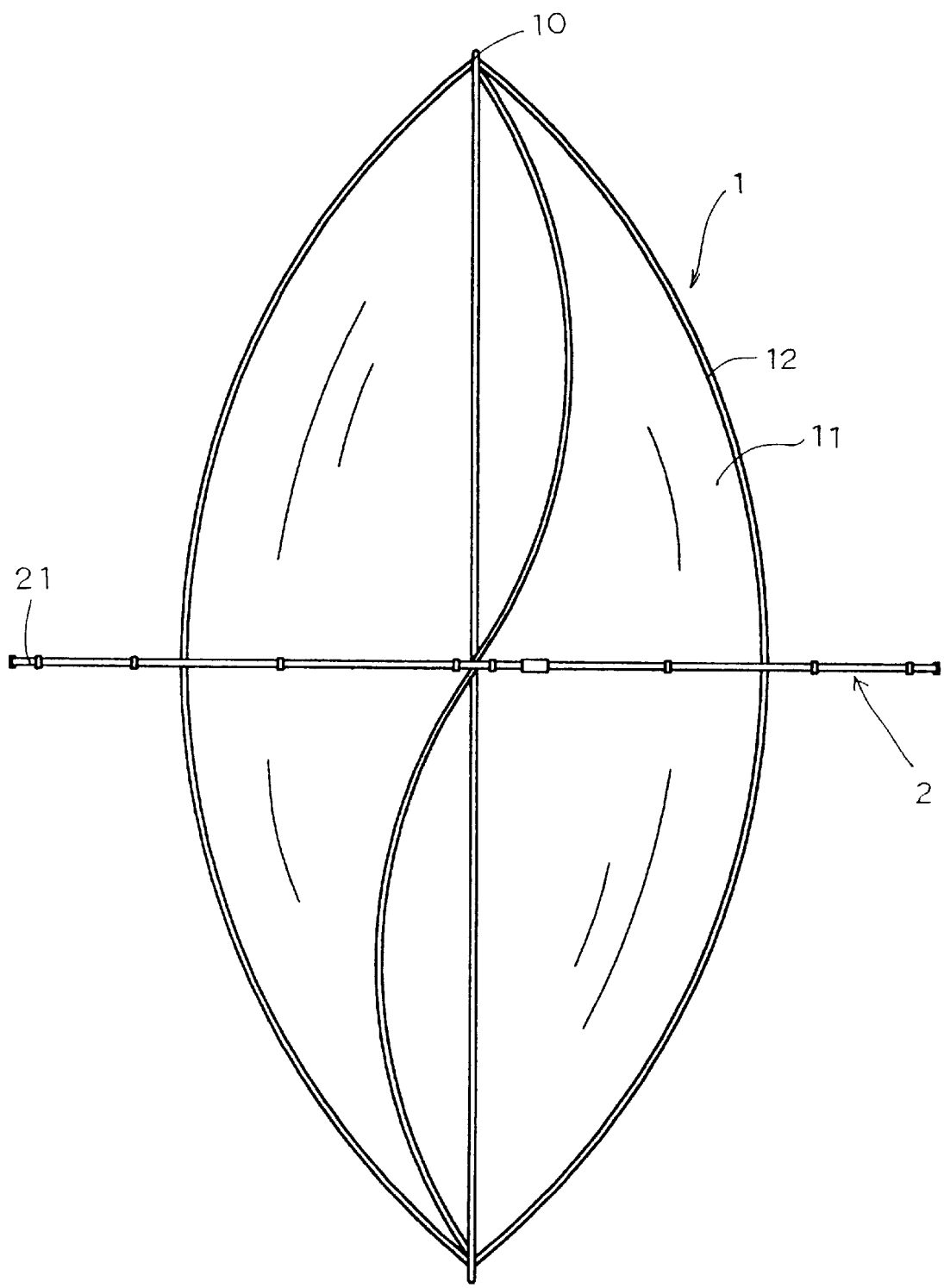
FIG. 4 is an elevational view of a kite device of a preferred embodiment in accordance with the present invention.
Figure 5:
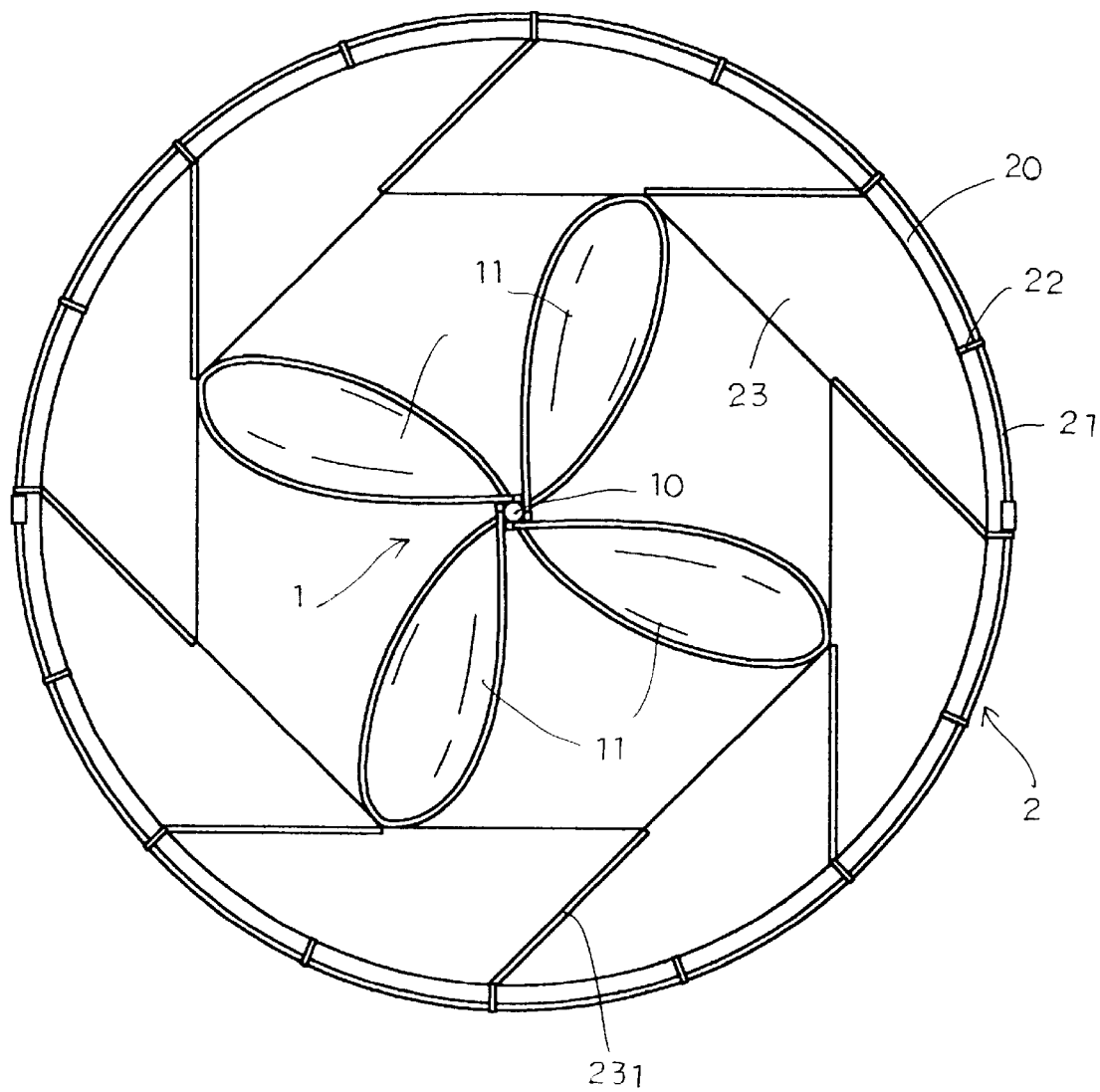
FIG. 5 is a bottom plan view of a kite device of a preferred embodiment in accordance with the present invention.
Figure 6A:
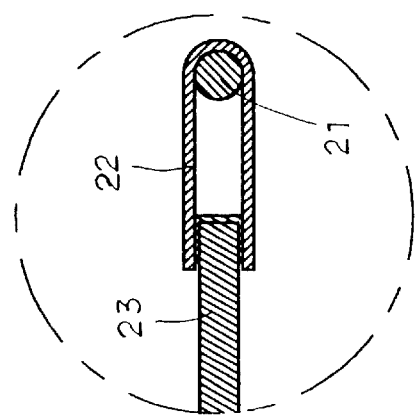
FIG. 6A is a sectional schematic view illustrating a collar engaging with a first flexible rod of a preferred embodiment in accordance with the present invention.
Figure 6:
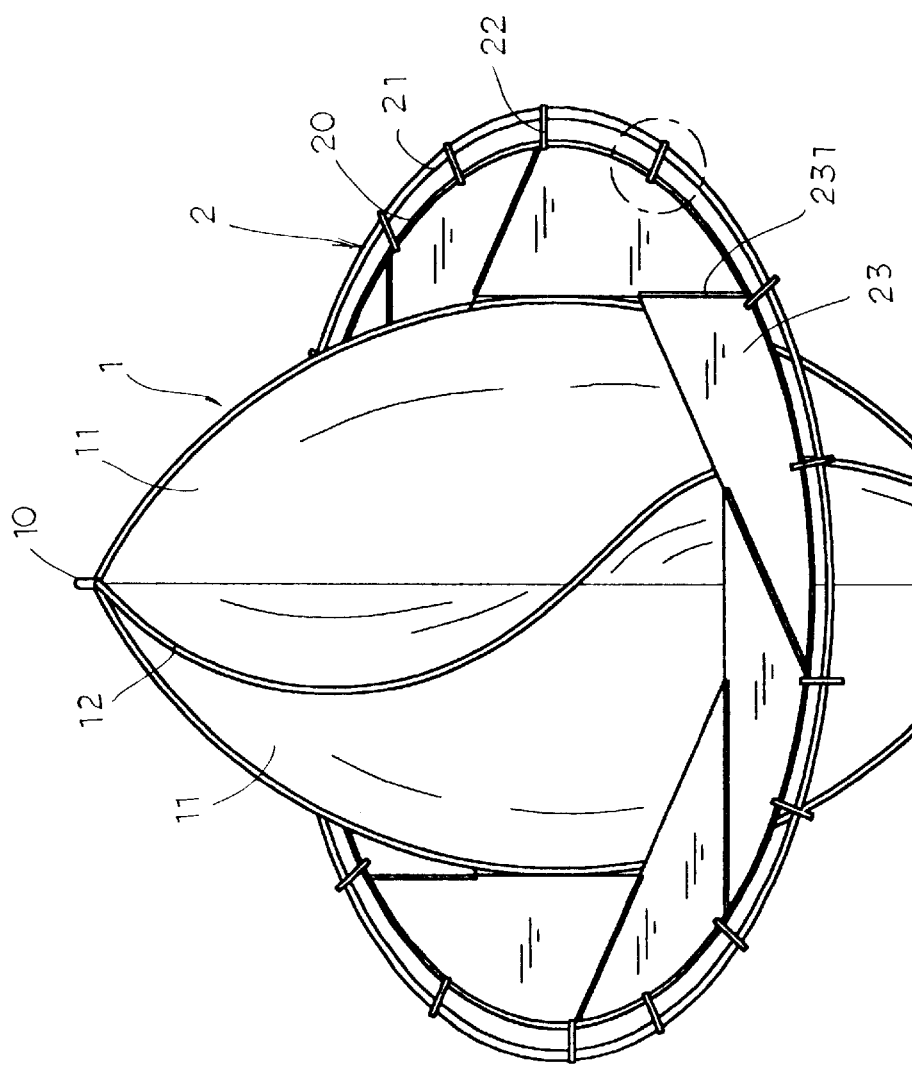
FIG. 6 is a third perspective assembly view of a kite device of a preferred embodiment in accordance with the present invention.
Figure 7A:
FIG. 7 is a fourth perspective assembly view of a kite device of a preferred embodiment in accordance with the present invention.
Figure 7:
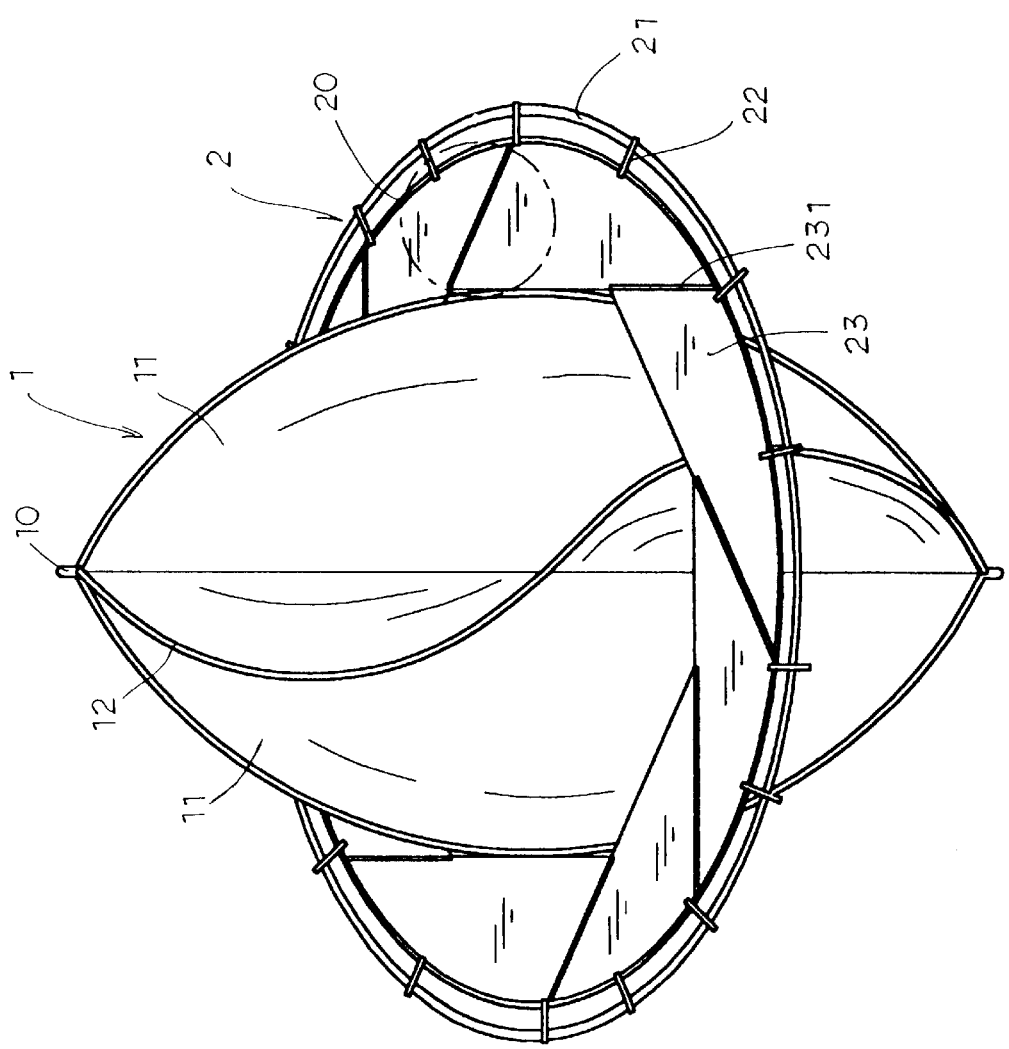

Referring to FIGS. 1 to 7, a kite device comprises an inner main body 1, and an outer main body 2 surrounding the inner main body 1.

The inner main body 1 has a main shaft 10, a plurality of fabric plates 11 adhered on the main shaft 10, and each of the fabric plates 11 having an edge to receive a support frame 12.

The outer main body 2 has a first flexible rod 21 having a first end socket 211 and a second end socket 212, a second flexible rod 21a having a first end 211a inserted in the first end socket 211 and a second end 212a inserted in the second end socket 212, and a waterproof fabric sheet 20 having a plurality of triangular fabric pieces 23 and a plurality of spacings 231 formed among the triangular fabric pieces 23.

A plurality of collars 22 are disposed on an outer periphery of the waterproof fabric sheet 20.

Each of the collars 22 clamps the corresponding triangular fabric pieces 23 and encloses one of the corresponding first flexible rod 21 and the second flexible rod 21a.

A length of the support frame 12 is longer than a length of the edge of each fabric plate 11.

Each of the triangular fabric pieces 23 is sewed with the corresponding fabric plate 11.

Referring to FIG. 8, a flying line 3 is connected to the main shaft 10.

Figure 9:
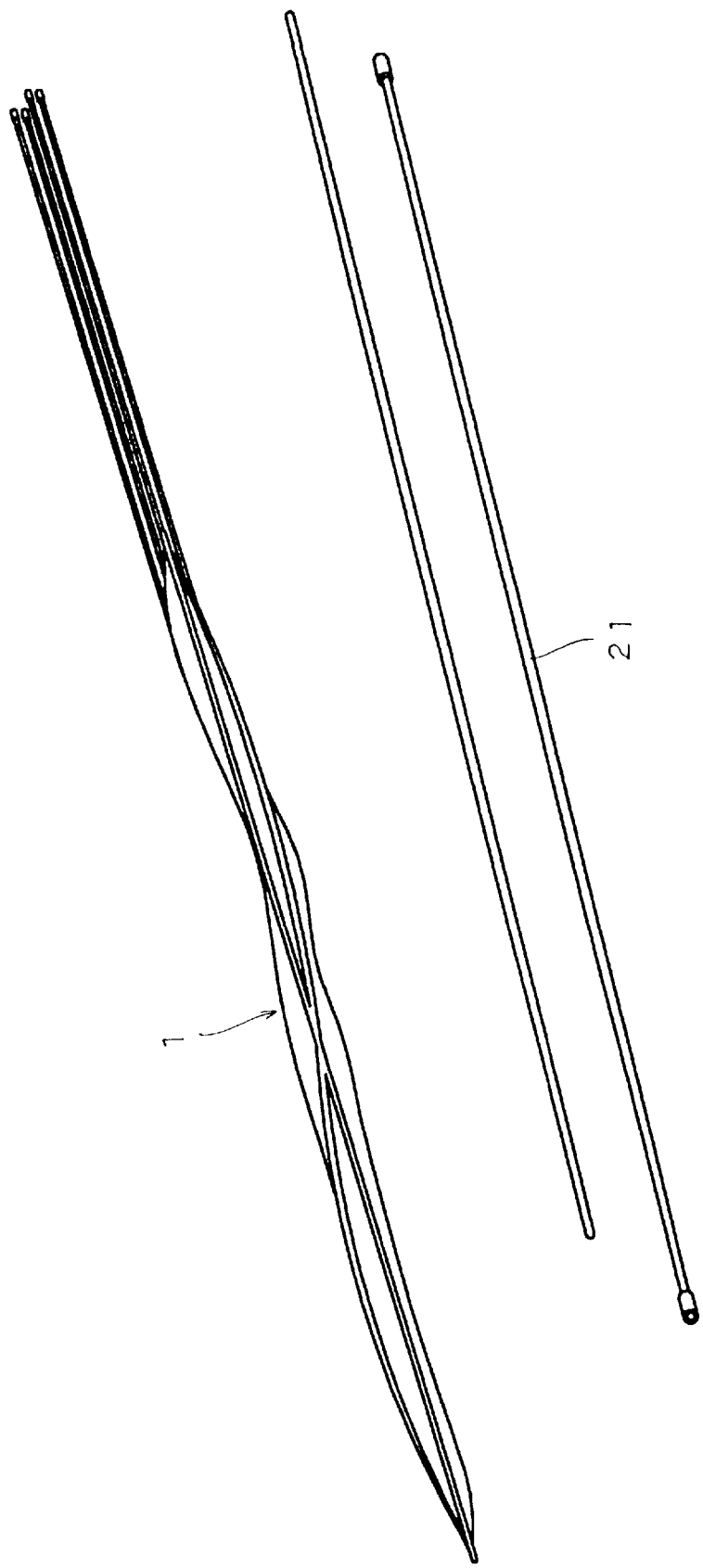
FIG. 9 is a schematic view illustrating a kite device of a preferred embodiment being detached.

Referring to FIG. 9, the kite device is detached.

The present invention has the following advantages.

The kite device is easily detached. The kite device has the outer main body surrounding the inner main body in order to increase areas for facing winds. The kite device has an outer main body having a plurality of spacings to facilitate air currents to pass through the spacings in order to balance the kite device.

The present invention is not limited to the above embodiments but various modification thereof may be made. Furthermore, various changes in form and detail may be made without departing from the scope of the present invention.

I claim:

1. A kite device comprises:

an inner main body, an outer main body surrounding the inner main body, the inner main body having a main shaft, a plurality of fabric plates adhered on the main shaft, and each of the fabric plates having an edge to receive a support frame, the outer main body having a first flexible rod having a first end socket and a second end socket, a second flexible rod having a first end inserted in the first end socket and a second end inserted in the second end socket, and a waterproof fabric sheet having a plurality of triangular fabric pieces and a plurality of spacings formed among the triangular fabric pieces, a plurality of collars disposed on an outer periphery of the waterproof fabric sheet, and each of the collars clamping the corresponding triangular fabric pieces and enclosing one of the corresponding first flexible rod and the second flexible rod.

2. The kite device as claimed in claim 1, wherein a length of the support frame is longer than a length of the edge of each said fabric plate.

3. The kite device as claimed in claim 1, wherein each of the triangular fabric pieces is sewed with the corresponding fabric plate.

* * * * *